(12) United States Patent
Huang

(10) Patent No.: US 8,274,606 B2
(45) Date of Patent: Sep. 25, 2012

(54) VIDEO RECEIVING APPARATUS

(75) Inventor: Kuo-Wei Huang, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1041 days.

(21) Appl. No.: 12/222,353

(22) Filed: Aug. 7, 2008

(65) Prior Publication Data

US 2009/0244383 A1 Oct. 1, 2009

(30) Foreign Application Priority Data

Mar. 25, 2008 (TW) .............................. 97110488 A

(51) Int. Cl.
*H04N 5/14* (2006.01)
(52) U.S. Cl. .......................... 348/575; 348/572; 348/576
(58) Field of Classification Search .................. 348/571, 348/572, 575, 576
See application file for complete search history.

(56) References Cited

U.S. PATENT DOCUMENTS

| 6,577,348 | B1 * | 6/2003 | Park ............................... 348/554 |
| 7,480,012 | B1 * | 1/2009 | Greenberg .................... 348/572 |
| 2002/0145661 | A1 * | 10/2002 | Takahashi et al. ............. 348/65 |
| 2003/0132986 | A1 * | 7/2003 | Yun .................................. 347/51 |

FOREIGN PATENT DOCUMENTS

| CN | 1525751 A | 9/2004 |
| EP | 1453325 A1 | 9/2004 |
| JP | 01-243785 A | 9/1989 |
| JP | 07-087527 A | 3/1995 |
| JP | 11-027569 A | 1/1999 |

* cited by examiner

*Primary Examiner* — Farzana Hossain

(74) *Attorney, Agent, or Firm* — Rabin & Berdo, P.C.

(57) ABSTRACT

A video receiving apparatus comprises a switch, an analog-to-digital converter (ADC), a video processing circuit and a decoder is provided. The ADC receives a first analog channel data from the switch within a plurality of first periods and receives a second analog channel data from the switch within a plurality of second periods, and output a digital video signal. The sampling frequency of the ADC is a plurality of times of a switching frequency of the switch. The video processing circuit includes a recovery circuit and a noise reduction circuit. The recovery circuit restores the digital video signal to a recovery video signal corresponding to a video format of the analog video signal. The noise reduction circuit reduces noises generated by the switch according to the digital video signal. The decoder outputs a display signal according to the analog video signal.

19 Claims, 6 Drawing Sheets

US 8,274,606 B2

VIDEO RECEIVING APPARATUS

This application claims the benefit of Taiwan application Serial No. 97110488, filed Mar. 25, 2008, the subject matter of which is incorporated herein by reference.

BACKGROUND OF THE INVENTION

1. Field of the Invention

The invention relates in general to a video receiving apparatus, and more particularly to a video receiving apparatus capable of supporting various video formats.

2. Description of the Related Art

There are three most commonly used video formats for analog video signal, namely, component format, S-Video format and composite format. The three video formats each requiring different number of channels. According to the component format, on the part of the analog video signal, analog channel data Y, analog channel data Cb and analog channel data Cr are independently transmitted in three channels. According to the S-Video format, analog channel data Y and analog channel data C are separately transmitted in two channels, wherein analog channel data C is obtained by combining analog channel data Cb and analog channel data Cr in the same channel and then outputting the combined analog channel data. According to the composite format, analog channel data Y, analog channel data Cb and analog channel data Cr are combined in the same channel first and then the combined analog channel data is outputted next.

Therefore, a conventional video receiving apparatus capable of supporting the component format, the S-Video format and the composite format at least needs three analog-to-digital converters (ADCs) to convert an analog video signal into a digital video signal. As conventional video receiving apparatus employs multiple ADCs, manufacturing cost is increased and market competitiveness is jeopardized.

SUMMARY OF THE INVENTION

The invention is directed to a video receiving apparatus capable of supporting analog video signals of various video formats by an analog-to-digital converter (ADC).

According to a first aspect of the present invention, a video receiving apparatus is provided. The video receiving apparatus receives an analog video signal at least comprising a first analog channel data and a second analog channel data. The video receiving apparatus comprises a switch, an analog-to-digital converter (ADC), a video processing circuit and a decoder. The switch is selectively coupled to the first channel or the second channel so as to transmit the first analog channel data within a plurality of first periods and to transmit the second analog channel data within a plurality of second periods to the ADC.

The ADC coupled to the switch receives the first analog channel data from the switch within the first periods and receives the second analog channel data from the switch within the second periods, and performs analog-to-digital conversion on the first analog channel data and the second analog channel data according to a sampling frequency to output a digital video signal. The sampling frequency is a plurality of times of a switching frequency of the switch. The video processing circuit coupled to the ADC comprises a recovery circuit and a noise reduction circuit. The recovery circuit restores the digital video signal to a recovery video signal corresponding to a video format of the analog video signal. The noise reduction circuit reduces noises generated by the switch according to the digital video signal. The decoder coupled to the video processing circuit outputs a display signal according to the analog video signal.

According to a second aspect of the present invention, a video receiving apparatus is provided. The video receiving apparatus receives an analog video signal comprising a first analog channel data, a second analog channel data and a third analog channel data. The video receiving apparatus comprises a switch, an ADC, a video processing circuit and a decoder. The switch is selectively coupled to the first channel, the second channel or the third channel so as to respectively transmit the first analog channel data within a plurality of first periods, the second analog channel data within a plurality of second periods and the third analog channel data within a plurality of third periods.

The ADC coupled to the switch receives the first analog channel data, the second analog channel data and the third analog channel data from the switch within the first periods, the second periods and the third periods respectively, and performs analog-to-digital conversion on the first, the second and the third analog channel data respectively according to a sampling frequency to output a digital video signal. The sampling frequency is a plurality of times of a switching frequency of the switch. On the part of the digital video signal, the ratio of the component corresponding to the first analog channel data vs. the component corresponding to the second analog channel data vs. the component corresponding to the third analog channel data is 4:2:2. The video processing circuit outputs a recovery video signal according to the digital video signal. The decoder outputs a display signal according to the analog video signal.

According to a third aspect of the present invention, a video receiving apparatus is provided. The video receiving apparatus receives an analog video signal at least comprising a first analog channel data and a second analog channel data. The video receiving apparatus comprises a switch, an ADC, a video processing circuit and a decoder. The switch is selectively coupled to the first channel or the second channel so as to respectively transmit the first analog channel data within a plurality of first periods and the second analog channel data within a plurality of second periods.

The ADC coupled to the switch receives the first analog channel data and the second analog channel data from the switch within the first periods and second periods respectively. The ADC further performs analog-to-digital conversion on the first analog channel data and the second analog channel data according to a sampling frequency to output a digital video signal. The sampling frequency is a plurality of times of a switching frequency of the switch. The video processing circuit outputs a recovery video signal according to the digital video signal. On the part of the recovery video signal, the ratio of the brightness component vs. the first chrominance component vs. the second chrominance component is 4:2:2. The decoder outputs a display signal according to the analog video signal.

The invention will become apparent from the following detailed description of the preferred but non-limiting embodiments. The following description is made with reference to the accompanying drawings.

DETAILED DESCRIPTION OF THE INVENTION

Figure 1:
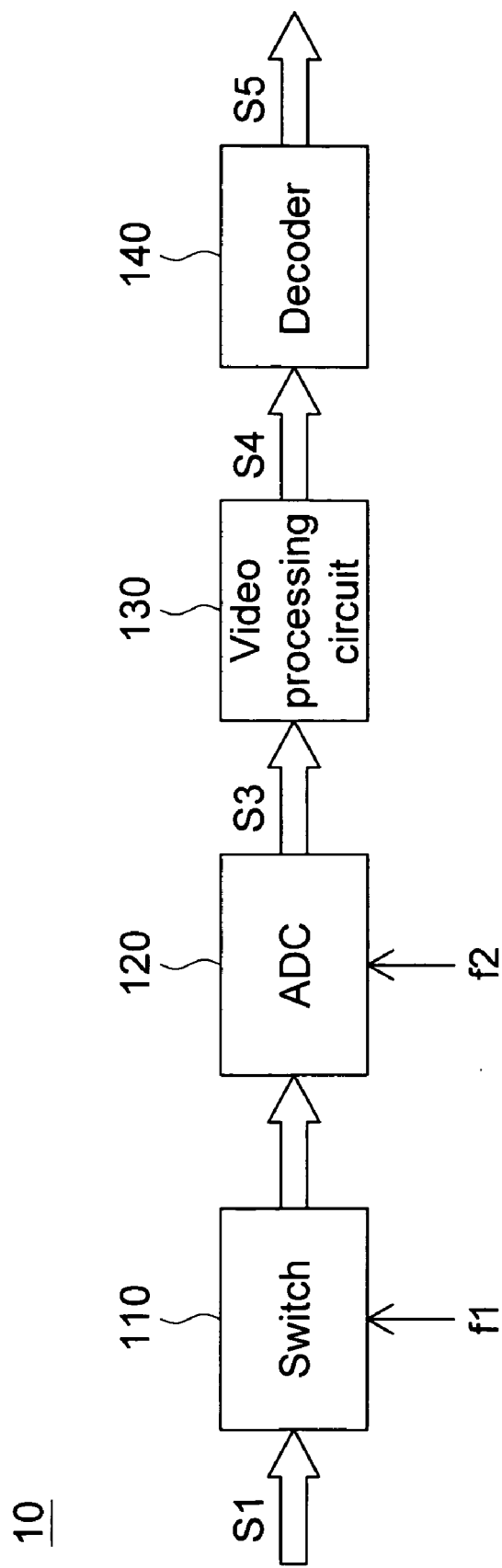
FIG. 1 shows a block diagram of a video receiving apparatus according to a preferred embodiment of the invention.

Referring to FIG. 1, a block diagram of a video receiving apparatus according to a preferred embodiment of the invention is shown. The video receiving apparatus 10 receives and converts an analog video signal S1 into a display signal S4, and then outputs the display signal S4. The video receiving apparatus 10 is capable of supporting the analog video signal S1 of various video formats. Examples of the video format of the analog video signal S1 include component format, S-Video format and composite format.

The abovementioned video receiving apparatus 10 comprises a switch 110, an analog-to-digital converter (ADC) 120, a video processing circuit 130 and a decoder 140. The ADC 120 is coupled to the switch 110. The video processing circuit 130 is coupled to the ADC 120. The decoder 140 is coupled to the video processing circuit 130. When the analog video signal S1 comprises multiple analog channel data, the multiple analog channel data are respectively outputted to the video receiving apparatus 10 via multiple channels. The switch 110 selectively couples the multiple channels to the ADC 120, so that the ADC 120 samples the analog video signal S1 via the switch 110 to output a digital video signal S3. The sampling frequency f2 of the ADC 120 is a plurality of times of switching frequency f1 of the switch 110. In the present embodiment of the invention, the switch 110 controls the signal inputted to the ADC 120 by way of switching the switching frequency f2. The ADC 120 samples the signal according to the sampling frequency f2 to produce the digital video signal S3. The video processing circuit 130 outputs a recovery video signal S4 to the decoder 140 according to the digital video signal S3, so that the decoder 140 outputs a display signal S5 according to the recovery video signal S4.

The video processing circuit 130 can further reduces the noises caused by switching the switch 110 according to the digital video signal S3. On the part of the outputted digital video signal S3, the ADC 120 further enables the ratio of the brightness component (Y) vs. the chrominance component (Cb) vs. the chrominance component (Cr) to be 4:2:2. Or, on the part of the digital video signal S3, the ratio of brightness component (Y) vs. chrominance component (Cb) vs. chrominance component (Cr) is not 4:2:2, but on the part of the outputted recovery video signal S4, the video processing circuit 130 enables the ratio of the brightness component (Y) vs. chrominance component (Cb) vs. chrominance component (Cr) to be 4:2:2.

As the video receiving apparatus 10 disclosed above supports the analog video signal of various video formats by one rather than multiple ADCs, and the manufacturing cost is thus reduced effectively.

Figure 2:
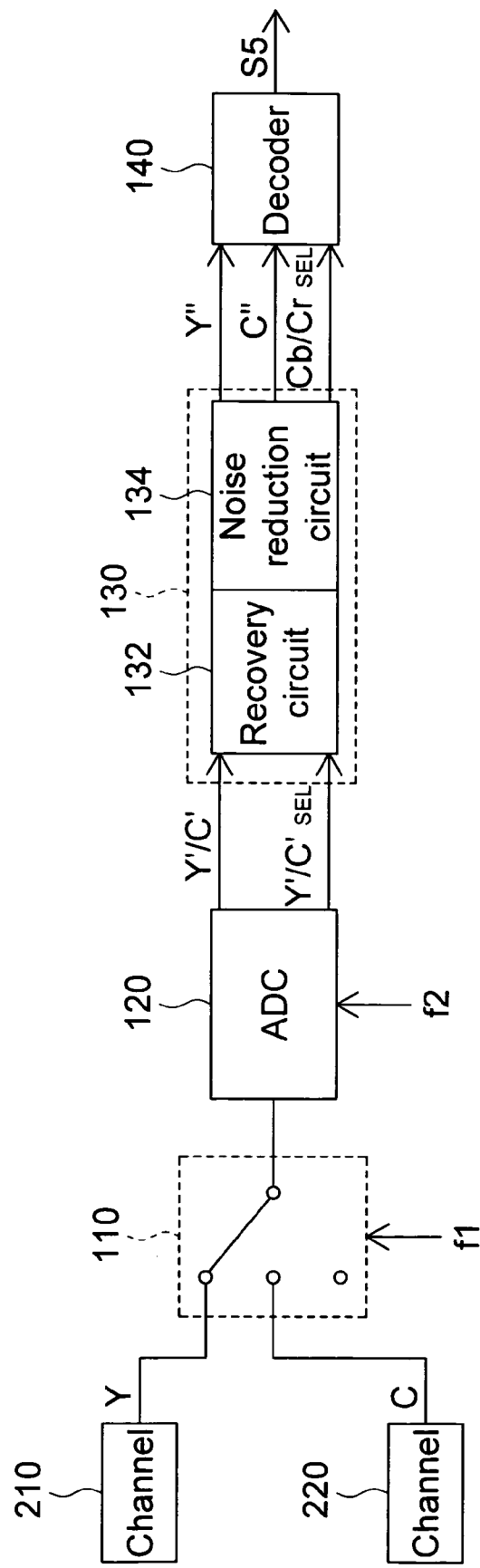
FIG. 2 shows a perspective of a video receiving apparatus 10 adopting S-Video format for an analog video signal S1.

Referring to FIG. 2, a perspective of a video receiving apparatus 10 adopting S-Video format for an analog video signal S1 is shown. When the analog video signal S1 is of S-Video format, the analog video signal S1 comprises an analog channel data Y and an analog channel data C. The analog channel data Y and the analog channel data C are transmitted via a channel 210 and a channel 220 respectively. The analog channel data Y is brightness data, and the analog channel data C is obtained by combining two different types of chrominance data in the same channel and outputting the combined chrominance data. The analog channel data Y is denoted by Y1-Y4 in FIG. 3, and the analog channel data C is denoted by C1-C4 in FIG. 3.

When the analog video signal S1 comprises an analog channel data Y and an analog channel data C, the switch 110 is operated under the switching frequency f1. The ADC 120 is electrically connected to the channel 210 via the switch 110 within a plurality of first periods so as to transmit the analog channel data Y within the first periods. The ADC 120 is electrically connected to the channel 220 via the switch 110 within a plurality of second periods so as to transmit an analog channel data C within the second periods.

The ADC 120 receives the analog channel data Y from the switch 110 within the first periods and receives analog channel data C from the switch 110 within the second periods. The ADC 120 further performs analog-to-digital conversion on the analog channel data Y and the analog channel data C according to the sampling frequency f2 to output the digital video signal S3. The abovementioned sampling frequency f2 is a plurality of times of the switching frequency f1 of the switch 110. The ADC 120 outputs the sampling channel data Y' of the digital video signal S3 corresponding to the analog channel data Y according to the received analog channel data Y. The ADC 120 outputs the sampling channel data C' of the digital video signal S3 corresponding to the analog channel data C according to the received analog channel data C.

Of the digital video signal S3 outputted by the abovementioned ADC 120, the ratio of the component corresponding to the sampling channel data Y' vs. the component corresponding to the sampling channel data C' is 4:4. The sampling channel data C' further comprises a sampling chrominance data Cb' and a sampling chrominance data Cr'. On the part of the digital video signal S3, the ADC 120 preferably enables the ratio of the component corresponding to the sampling channel data Y' vs. the component corresponding to sampling chrominance data Cb' vs. the component corresponding to sampling chrominance data Cr' to be 4:2:2. That is, on the part of the recovery video signal S4, the ratio of the brightness component (Y) vs. the chrominance component (Cb) vs. the chrominance component (Cr) is 4:2:2. The ADC 120 further outputs the selection signal Y'/C' SEL to the video processing circuit 130, so that the video processing circuit 130 determines whether the ADC 120 is currently outputting the sampling channel data Y' or the sampling channel data C' according to the selection signal Y/C SEL.

The video processing circuit 130 further comprises a recovery circuit 132 and a noise reduction circuit 134. The recovery circuit 132 restores the digital video signal S3 to a recovery video signal S4 corresponding to the S-Video format. The noise reduction circuit 134 reduces the noises caused by the switch 110 according to the digital video signal S3.

The recovery video signal S4 comprises a digital channel data Y" and a digital channel data C" which respectively correspond to the analog channel data Y and the analog channel data C. The digital channel data C" further comprises a digital chrominance data Cb" (not shown) and a digital chrominance data Cr" (not shown). The video processing circuit 130 further outputs the selection signal Cb/Cr SEL to the decoder 140, so that the decoder 140 determines whether the digital channel data C" is the digital chrominance data Cb" or the digital chrominance data Cr" according to the selection signal Cb/Cr SEL. On the part of the recovery video signal S4, the video processing circuit 130 further enables the ratio of the component corresponding to the digital channel data Y" vs. the component corresponding to the digital chrominance data Cb" vs. the component corresponding to the digital chrominance data Cr" to be 4:2:2. The decoder 140 further outputs a display signal S5 according to the digital channel data Y" and the digital channel data C".

Figure 3:
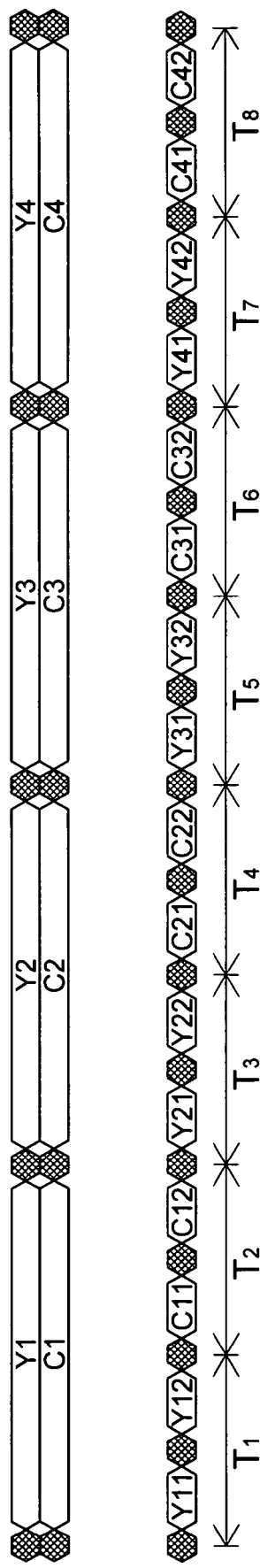
FIG. 3 shows a clock diagram corresponding to FIG. 2.

Referring to FIG. 3, a clock diagram corresponding to FIG. 2 is shown. To make the invention easier and simpler to understand, the sampling frequency of FIG. 3 is exemplified by a quadruple frequency. The analog channel data Y, the analog channel data C, the sampling channel data Y' and the sampling channel data C' shown in FIG. 2 are respectively denoted by Y1-Y4, C1-C4, Y11-Y42 and C11-C42 in FIG. 3.

For the ADC 120 to receive the analog channel data Y and the analog channel data C which are transmitted via the channel 210 and the channel 220 respectively, the switch needs to switch the channel 210 and the channel 220 according to a switching frequency of double frequency. However, switching multiple channels would easily be interfered with by noises, hence resulting in data distortion. To resolve the above problem, the sampling frequency f2 of the ADC 120 is preferably controlled to be a plurality of times of switching frequency f1 of the switch 110. For convenience of elaboration, the sampling frequency f2 in FIG. 3 is double of switching frequency f1. As the switching frequency f1 is switched by double frequency and the sampling frequency f2 is double of switching frequency f1, the ADC 120 samples the analog channel data Y1-Y4 and the analog channel data C1-C4 of the analog video signal S1 by a quadruple frequency.

In FIG. 3, the first periods are denoted by periods T1, T3, T5 and T7, and the second periods are denoted by periods T2, T4, T6 and T8. The switch 110 transmits the analog channel data Y1-Y4 within periods T1, T3, T5 and T7 and transmits the analog channel data C1-C4 within periods T2, T4, T6 and T8.

The ADC 120 receives the analog channel data Y1-Y4 from the switch 110 within periods T1, T3, T5 and T7 respectively. The ADC 120 further receives the analog channel data C1-C4 from the switch 110 within periods T2, T4, T6 and T8 respectively. The ADC 120 further performs analog-to-digital conversion on the analog channel data Y1-Y4 and the analog channel data C1-C4 according to the sampling frequency f2 to output the sampling channel data Y11-Y42 and C11-C42.

In other words, the ADC 120 continuously samples the analog channel data Y1 twice to output the sampling channel data Y11 and Y12 within period T1. The ADC 120 continuously samples the analog channel data C1 twice to output the sampling channel data C11 and C12 within period T2. Similarly, the ADC 120 continuously samples the analog channel data Y2-Y4 twice to output the sampling channel data Y21, Y22, Y31, Y32, Y41 and Y42 within periods T3, T5 and T7 respectively. The ADC 120 continuously samples the analog channel data C2-C4 twice to output sampling channel data C21, C22, C31, C32, C41 and C42 within periods T4, T6 and T8 respectively.

As disclosed above, the sampling frequency f2 is a quadruple frequency to obtain a double of sampling channel data. The noise reduction circuit 134 uses different ways to reduce the noises caused by the switching of the switch 110 according to the sampling channel data Y11, Y12, C1, C12, Y21, Y22, Y31, Y32, Y41, Y42, C21, C22, C31 and C32 outputted by the ADC 120.

The noise reduction circuit 134 is, for example, a mean filter for example. The noise reduction circuit 134 calculates the average value of the sampling channel data as the digital channel data Y" within each of first periods. For example, the noise reduction circuit 134 calculates the average value of the sampling channel data Y11 and Y12 within period T1, calculates the average value of the sampling channel data Y21 and Y22 within period T3, calculates the average value of the sampling channel data Y31 and Y32 within period T5, and calculates the average value of the sampling channel data Y41 and Y42 within period T7. The noise reduction circuit 134 further outputs the average value of the sampling channel data Y11 and Y12, the average value of the sampling channel data Y21 and Y22, the average value of the sampling channel data Y31 and Y32, and the average value of the sampling channel data Y41 and Y42 as the digital channel data Y".

Similarly, the noise reduction circuit 134 calculates the average value of the sampling channel data as digital channel data C" within each of the second period. For example, the noise reduction circuit 134 calculates the average value of the sampling channel data C1 and C12 within period T2, calculates the average value of the sampling channel data C21 and C22 within period T4, calculates the average value of the sampling channel data C31 and C32 within period T6, and calculates the average value of the sampling channel data C41 and C42 within period T8. The noise reduction circuit 134 outputs the average value of the sampling channel data C11 and C12, the average value of the sampling channel data C21 and C22, the average value of the sampling channel data C31 and C32, the average value of sampling channel data C41 and C42 as the digital channel data C". As the average value of every two items of sampling channel data in the first period or the second period is averaged by a mean filter and then outputted as a digital channel data, the noises caused by switching the channels is reduced.

Or, the noise reduction circuit 134 selects the sampling channel data having fewer noises as the digital channel data Y" from the sampling channel data within each of first periods, and selects the sampling channel data having fewer noises as the digital channel data C" from the sampling channel data within each of the second period. For example, the first item of sampling channel data (that is, Y11, Y21, Y31, Y41) switched by the switch 110 is easily interfered with by noises, then the noise reduction circuit 134 preferably selects the sampling channel data Y12 within period T1, the sampling channel data Y22 within period T3, the sampling channel data Y32 within period T5, and the sampling channel data Y42 within period T7 as the digital channel data and then outputs the selected sampling channel data accordingly.

Likewise, if the first item of sampling channel data (that is, C11, C21, C31, C41) switched by the switch 110 is easily interfered with by noises, then the noise reduction circuit 134 preferably selects the sampling channel data C12 within period T2, the sampling channel data C22 within period T4, the sampling channel data C32 within period T6, and the sampling channel data C42 within period T8 as the digital channel data outputs. As two items of sampling channel data are selected by the noise reduction circuit 134 and outputted as an item of digital channel data less interfered with by noises, the noises arise when switching the channels is reduced.

Besides, the sampling channel data Y11, Y12, Y21, Y22, Y31, Y32, Y41, Y42, C11, C12, C21, C22, C31, C32, C41 and C42 correspond to their respective weighted values. In period T1, the noise reduction circuit 134 determines a digital channel data Y" according to the sampling channel data Y11, the sampling channel data Y12 and their weighted values. In period T3, the noise reduction circuit 134 determines the digital channel data Y" according to the sampling channel data Y21, the sampling channel data Y22 and their weighted values. In period T5, the noise reduction circuit 134 determines the digital channel data Y" according to the sampling channel data Y31, the sampling channel data Y32 and their weighted value. In period T7, the noise reduction circuit 134 further determines the digital channel data Y" according to the sampling channel data Y41, the sampling channel data Y42 and their weighted values.

Likewise, in period T2, the noise reduction circuit 134 determines the digital channel data C" according to the sampling channel data C1, the sampling channel data C12 and their weighted values. In period T4, the noise reduction circuit 134 determines the digital channel data C" according to the sampling channel data C21, the sampling channel data C22 and their weighted values. In period T6, the noise reduction circuit 134 determines the digital channel data C" according to the sampling channel data C31, the sampling channel data C32 and their weighted values. In period T8, the noise reduction circuit 134 further determines the digital channel data C" according to the sampling channel data C41, the sampling channel data C42 and their weighted values.

Figure 4:
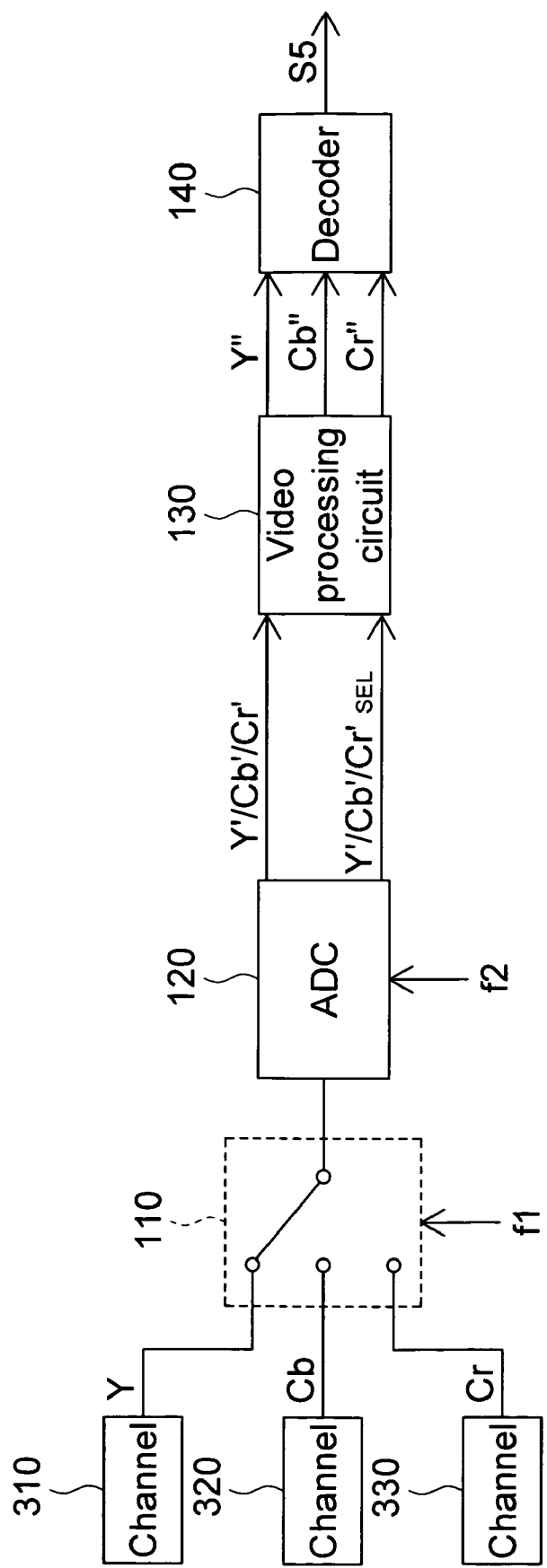
FIG. 4 shows a first perspective of the video receiving apparatus 10 adopting component format for the analog video signal S1.
Figure 5:
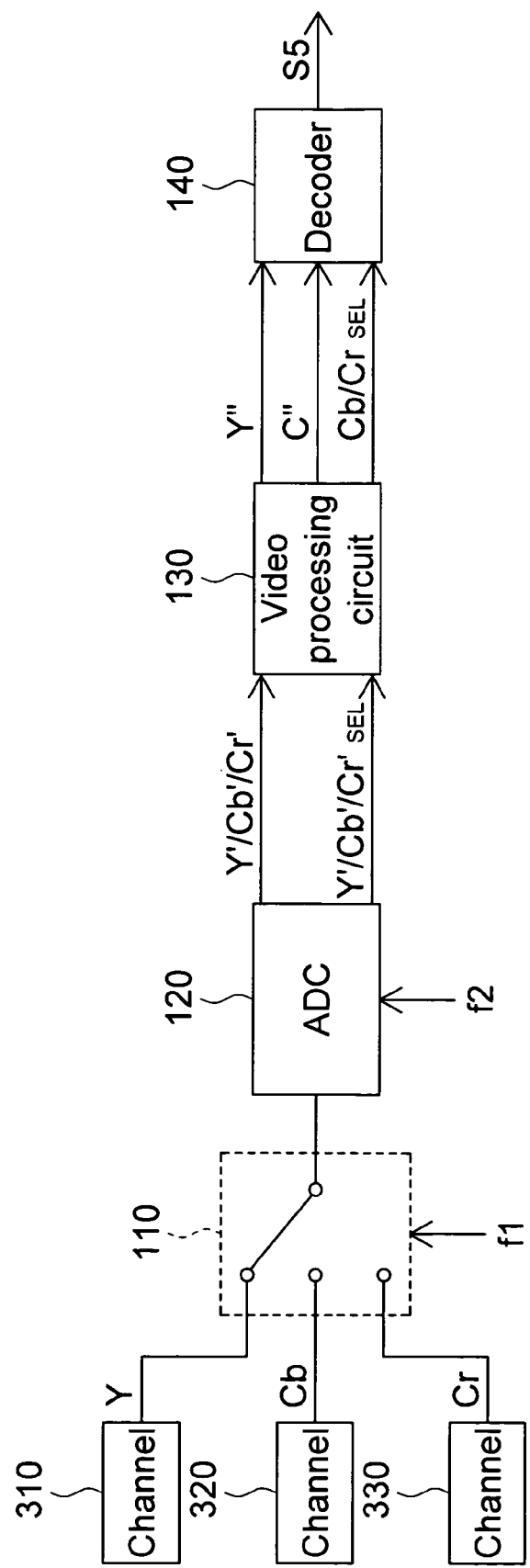
FIG. 5 shows a second perspective of the video receiving apparatus 10 adopting component format for the analog video signal S1.

Referring to FIG. 4, a first perspective of the video receiving apparatus 10 adopting component format for the analog video signal S1 is shown. When the video format of the analog video signal S1 is component format, the analog video signal S1 comprises an analog channel data Y, an analog channel data Cb and an analog channel data Cr. The analog channel data Y, the analog channel data Cb and the analog channel data Cr are transmitted via the channel 310, the channel 320 and the channel 330 respectively. The analog channel data Y is a brightness data. The analog channel data Cb and the analog channel data Cr are an analog chrominance data Cb and an analog chrominance data Cr respectively. In FIG. 5, the analog channel data Y is denoted by Y1-Y4, the analog channel data Cb is denoted by Cb1-Cb4, and the analog channel data Cr is denoted by Cr1-Cr4.

The switch 110 selectively enables the ADC 120 to be electrically connected to the channel 310, 320 or 320 according to the video format of the analog video signal S1. The switch 110 transmits the analog channel data Y within a plurality of first periods, transmits the analog channel data Cb within a plurality of second periods, and transmits the analog channel data Cr within a plurality of third periods.

The ADC 120 receives the analog channel data Y from the switch 110 within the first periods, receives the analog channel data Cb from the switch 110 within the second periods, and receives the analog channel data Cr from the switch 110 within the third periods. The ADC 120 further performs analog-to-digital conversion on the analog channel data Y, the analog channel data Cb and the analog channel data Cr according to the sampling frequency f2 to output the digital video signal S3. The sampling frequency f2 is a plurality of times of switching frequency 110.

The ADC 120 further outputs the selection signal Y'/Cb'/Cr" SEL to the video processing circuit 130, so that the video processing circuit 130, according to the selection signal Y'/Cb'/Cr" SEL, determines whether the ADC 120 is currently outputting the sampling channel data Y', the sampling channel data Cb' or the sampling channel data Cr'. The video processing circuit 130 outputs the digital channel data Y", the digital channel data Cb" and the digital channel data Cr" according to the sampling channel data Y', the sampling channel data Cb' or the sampling channel data Cr', wherein the digital channel data Cb" and the digital channel data Cr" are digital chrominance data of two different types. In FIG. 4, on the part of the recovery video signal S4, the video processing circuit 130 enables the ratio of the component corresponding to the digital channel data Y" vs. the component corresponding to the digital channel data Cb" vs. the component corresponding to the digital channel data Cr" to be 4:4:4. That is, on the part of the recovery video signal S4, the video processing circuit 130 enables the ratio of the component corresponding to the analog channel data Y vs. the component corresponding to the analog channel data Cb vs. corresponding to the analog channel data Cr to be 4:4:4.

Referring to FIG. 5, a second perspective of the video receiving apparatus 10 adopting component format for the analog video signal S1 is shown. In the present embodiment of the invention, on the part of the recovery video signal S4 outputted by the video processing circuit 130, the ratio of the component corresponding to the digital channel data Y" vs. the component corresponding to the digital channel data Cb" vs. the component corresponding to the digital channel data Cr" can be 4:2:2 in addition to being 4:4:4. That is, on the part of the recovery video signal S4, the component corresponding to the analog channel data Y vs. the component corresponding to the analog channel data Cb vs. the component corresponding to the analog channel data Cr can be 4:2:2 in addition to being 4:4:4.

Or, on the part of the outputted digital video signal S3, the ADC 120 enables ratio of the component corresponding to the sampling channel data Y' vs. the component corresponding to the sampling chrominance data Cb' vs. the component corresponding to the sampling chrominance data Cr' is 4:2:2. That is, on the part of the recovery video signal S4, the ratio of the component corresponding to the analog channel data Y vs. the component corresponding to the analog channel data Cb vs. the component corresponding to the analog channel data Cr is 4:2:2.

FIG. 5 differs with FIG. 4 in that on the part of the recovery video signal S4, when the ratio of the component corresponding to the digital channel data Y" vs. the component corresponding to the digital channel data Cb" vs. the component corresponding to the digital channel data Cr" is 4:2:2, the digital channel data Cb" (not shown) and the digital channel data Cr" (not shown) are combined as a digital channel data C" to be outputted to the decoder 140. Moreover, the video processing circuit 130 outputs the selection signal Cb/Cr SEL to the decoder 140, so that the decoder 140 determines whether the digital channel data C" is a digital chrominance data Cb" or a digital chrominance data Cr" according to the selection signal Cb/Cr SEL.

On the part of the recovery video signal S4, when the ratio of the component corresponding to the digital channel data Y" vs. the component corresponding to the digital channel data Cb" vs. the component corresponding to the digital channel data Cr' is 4:4:4, the sampling frequency f2 of the ADC needs to be increase to 6-times frequency. On the part of the recovery video signal S4, when the ratio of the component corresponding to the digital channel data Y" vs. the component corresponding to the digital channel data Cb" vs. the component corresponding to the digital channel data Cr" is 4:2:2, the sampling frequency f2 of the ADC can be decreased to quadruple frequency. Besides, in a preferred embodiment of the invention, the switching sequence of the switch 110 can be altered accordingly to fit different output situations, so that on the part of the sampling information ratio of various channels, the ADC 120 can comply with the output information ratio. For example, on the part of the recovery video signal S4, when the ratio of the component corresponding to the digital channel data Y" vs. the component corresponding to the digital channel data Cb" vs. the component corresponding to the digital channel data Cr" is 4:4:4, as the three channels output the same volume of information, the switch 110 can switch the three channels in order so that the following ADC 120 can sample three channels Y, Cb, Cr to the same volume. On the part of the recovery video signal S4, when the ratio of the component corresponding to the digital channel data Y" vs. the component corresponding to the digital channel data Cb"

vs. the component corresponding to the digital channel data Cr" is 4:2:2. As the volume of the information outputted by the three channels (Y, Cb, Cr) is 4:2:2, the switch 110 can control its switch so that the ratio of the sampling information outputted to the ADC 120 for the three channels is also 4:2:2. For example, the switch 110 can control the input of the three channels in the order of Y, Cb, Y, and Cr. Thus, the following ADC 120 will continuously sample the three channels in this order, also (that is, the ratio of the volumes of sampling the three channels by the ADC 120 is also 4:2:2).

Figure 6:
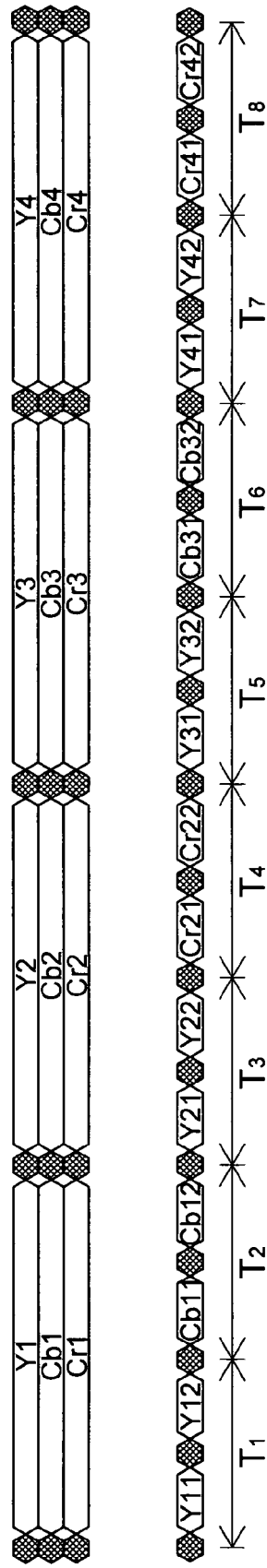
FIG. 6 shows a clock diagram corresponding to FIG. 5

Referring to FIG. 6, a clock diagram corresponding to FIG. 5 is shown. To make the invention easier to understand, the sampling frequency is a quadruple frequency in FIG. 6. The analog channel data Y, the analog channel data Cb, the analog channel data Cr, the sampling channel data Y', the sampling channel data Cb' and the sampling channel data Cr' of FIG. 5 are respectively denoted by Y1-Y4, Cb1-Cb4, Cr1-Cr4, Y11-Y42, Cb1-Cb4 and Cr11-Cr42 in FIG. 6.

For the ADC 120 to receive the analog channel data Y, the analog channel data Cb, and the analog channel data Cr transmitted via the channel 310 and the channel 320 and the channel 330, the switch needs to switch the channels 310, 320 and 330. However, switching multiple channels would easily be interfered with by noises, hence resulting in data distortion. To resolve the above problem, the sampling frequency f2 of the ADC 120 is preferably controlled to be a plurality of times of switching frequency f1 of the switch 110. For convenience of elaboration, the sampling frequency f2 in FIG. 6 is exemplified by a double of switching frequency f1. On the part of the recovery video signal S4, when the ratio of the component corresponding to the digital channel data Y" vs. the component corresponding to the digital channel data Cb" vs. the component corresponding to the digital channel data Cr" is 4:2:2, the switching frequency f1 is a double frequency and the sampling frequency f2 is a double of switching frequency f1. Therefore, the ADC 120 samples the analog channel data Y1-Y4, the analog channel data Cb1-Cb4 and the analog channel data Cr1-Cr4 of the analog video signal S1 by a quadruple frequency.

The first periods are denoted by periods T1, T3, T5 and T7 in FIG. 6. The second periods are denoted by periods T2 and T6 in FIG. 6. The third periods are denoted by periods T4 and T8 in FIG. 6. The switch 110 respectively transmits the analog channel data Y1-Y4 within periods T1, T3, T5 and T7, transmits the analog channel data Cb1 and Cb3 within periods T2 and T6, and transmit the analog channel data Cr2 and Cr4 within periods T4 and T8.

The ADC 120 receives the analog channel data Y1-Y4 from the switch 110 within periods T1, T3, T5 and T7 respectively. The ADC 120 further receives the analog channel data Cb1 and Cb3 from the switch 110 within periods T2 and T6 respectively. The ADC 120 further receives the analog channel data Cr2 and Cr4 from the switch 110 within periods T4 and T8 respectively. The ADC 120 performs analog-to-digital conversion to the analog channel data Y1-Y4, Cb1, Cb3, Cr2 and Cr4 according to the sampling frequency f2 to output the sampling channel data Y11, Y12, Cb11, Cb12, Y21, Y22, Cr21, Cr22, Y31, Y32, Cb31, Cb32, Y41, Y42, Cr41 and Cr42.

In other words, the ADC 120 continuously samples the analog channel data Y1 twice to output the sampling channel data Y11 and Y12 within period T1. The ADC 120 continuously samples the analog channel data Cb1 twice to output the sampling channel data Cb11 and Cb12 within period T2. The ADC 120 continuously samples the analog channel data Cr2 twice to output the sampling channel data Cb21 and Cb22 within period T2. Similarly, the ADC 120 continuously samples the analog channel data Y2-Y4 twice to output sampling channel data Y21, Y22, Y31, Y32, Y41 and Y42 within periods T3, T5 and T7 respectively. The ADC 120 continuously samples the analog channel data Cb3 and Cr4 twice to output the sampling channel data Cb31, Cb32, Cr41 and Cr42 within periods T6 and T8 respectively.

As disclosed above, the sampling frequency f2 is a quadruple frequency to obtain a double of sampling channel data. The video processing circuit 130 can reduce the noises caused by the switching of the switch 110 according to the sampling channel data Y31, Y32, Cb31, Cb32, Y41, Y42, Cr41 and Cr42 outputted by the ADC 120. Because the mechanisms of reducing the noises have been illustrated in the above disclosure, further illustration is omitted here for brevity.

The video receiving apparatus disclosed in the above embodiment of the invention supports various video formats by one ADC only, hence effectively reducing manufacturing cost. Besides, the video receiving apparatus can further enable the digital video signal S3 to reduce the noises arise when switching the switch.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video receiving apparatus for receiving an analog video signal comprising first analog channel data and second analog channel data, the video receiving apparatus comprising:
   a switch selectively coupled to a first channel or a second channel so as to transmit the first analog channel data within a plurality of first periods and to transmit the second analog channel data within a plurality of second periods;
   an analog-to-digital converter (ADC) coupled to the switch for receiving the first analog channel data from the switch within the first periods and the second analog channel data from the switch within the second periods respectively, and performing analog-to-digital conversion on the first analog channel data and the second analog channel data according to a sampling frequency to output a digital video signal, wherein the sampling frequency is a plurality of times of a switching frequency of the switch;
   a video processing circuit coupled to the ADC, wherein the video processing circuit comprises:
      a recovery circuit for restoring the digital video signal to a recovery video signal corresponding to a video format of the analog video signal; and
      a noise reduction circuit for reducing noise generated by the switch according to the digital video signal; and
   a decoder coupled to the video processing circuit for outputting a display signal according to the recovery video signal;
   wherein the digital video signal comprises a plurality of first sampling channel data sets and second sampling channel data sets, the ADC continuously samples the first analog channel data sets a plurality of times in each of the first periods to obtain the first sampling channel data sets and the ADC continuously samples the second analog channel data sets a plurality of times in each of the second periods to obtain the second sampling channel data sets, wherein the recovery video signal comprises first digital channel data correspond to the first analog channel data and second digital channel data corresponding to the second analog channel data, and the noise reduction circuit calculates the average value of the first sampling channel data sets as the first digital channel data in each of the first periods and calculates the average value of the second sampling channel data sets as the second digital channel data in each of the second periods.

2. A video receiving apparatus for receiving an analog video signal comprising first analog channel data and second analog channel data, the video receiving apparatus comprising:

a switch selectively coupled to a first channel or a second channel so as to transmit the first analog channel data within a plurality of first periods and to transmit the second analog channel data within a plurality of second periods;

an analog-to-digital converter (ADC) coupled to the switch for receiving the first analog channel data from the switch within the first periods and the second analog channel data from the switch within the second periods respectively, and performing analog-to-digital conversion on the first analog channel data and the second analog channel data according to a sampling frequency to output a digital video signal, wherein the sampling frequency is a plurality of times of a switching frequency of the switch;

a video processing circuit coupled to the ADC, wherein the video processing circuit comprises:

a recovery circuit for restoring the digital video signal to a recovery video signal corresponding to a video format of the analog video signal; and a noise reduction circuit for reducing noise generated by the switch according to the digital video signal; and a decoder coupled to the video processing circuit for outputting a display signal according to the recovery video signal;

wherein the digital video signal comprises a plurality of first sampling channel data sets and second sampling channel data sets, the ADC continuously samples the first analog channel data a plurality of times in each of the first periods to obtain the first sampling channel data sets and the ADC continuously samples the second analog channel data a plurality of times in each of the second periods to obtain the second sampling channel data sets, wherein the recovery video signal comprises first digital channel data correspond to the first analog channel data and second digital channel data corresponding to the second analog channel data, and the noise reduction circuit selects one of the first sampling channel data sets as the first digital channel data in each of the first periods and selects one of the second sampling channel data sets as the second digital channel data sets in each of the second periods.

3. A video receiving apparatus for receiving an analog video signal comprising first analog channel data and second analog channel data, the video receiving apparatus comprising:

a switch selectively coupled to a first channel or a second channel so as to transmit the first analog channel data within a plurality of first periods and to transmit the second analog channel data within a plurality of second periods;

an analog-to-digital converter (ADC) coupled to the switch for receiving the first analog channel data from the switch within the first periods and the second analog channel data from the switch within the second periods respectively, and performing analog-to-digital conversion on the first analog channel data and the second analog channel data according to a sampling frequency to output a digital video signal, wherein the sampling frequency is a plurality of times of a switching frequency of the switch;

a video processing circuit coupled to the ADC, wherein the video processing circuit comprises:

a recovery circuit for restoring the digital video signal to a recovery video signal corresponding to a video format of the analog video signal; and a noise reduction circuit for reducing noise generated by the switch according to the digital video signal; and a decoder coupled to the video processing circuit for outputting a display signal according to the recovery video signal;

wherein the digital video signal comprises a plurality of first sampling channel data sets and second sampling channel data sets, the ADC continuously samples the first analog channel data a plurality of times in each of the first periods to obtain the first sampling channel data sets and the ADC continuously samples the second analog channel data a plurality of times in each of the second periods to obtain the second sampling channel data sets, and wherein the recovery video signal comprises first digital channel data corresponding to the first analog channel data and second digital channel data corresponding to the second analog channel data, and the first sampling channel data sets and the second sampling channel data sets respectively correspond to a plurality of weighted values, and the noise reduction circuit determines the first digital channel data and the second digital channel data according to the weighted values in each of the first periods and second periods respectively.

4. The video receiving apparatus according to claim 3, wherein the ADC further outputs a selection signal to the video processing circuit, so that the video processing circuit determines whether the ADC is currently outputting the first sampling channel data sets or the second sampling channel data sets.

5. The video receiving apparatus according to claim 4, wherein on the part of the digital video signal outputted from the digital analog converter, the ratio of the component corresponding to the first sampling channel data sets vs. the component corresponding to the second sampling channel data sets is 4:4.

6. The video receiving apparatus according to claim 4, wherein the video processing circuit further outputs a selection signal to the decoder, so that the decoder determines whether the second digital channel data is first digital chrominance data or second digital chrominance data.

7. The video receiving apparatus according to claim 6, wherein on the part of the recovery video signal outputted from the video processing circuit, the ratio of the component corresponding to the first digital channel data vs. the component corresponding to the first digital chrominance data vs. the component corresponding to the second digital chrominance data is 4:2:2.

8. The video receiving apparatus according to claim 7, wherein the first sampling channel data sets correspond to a brightness level.

9. A video receiving apparatus for receiving an analog video signal comprising first analog channel data, second analog channel data and third analog channel data, the video receiving apparatus comprising:

a switch selectively coupled to a first channel, a second channel, or a third channel so as to respectively transmit the first analog channel data within a plurality of first periods, the second analog channel data within a plurality of second periods and the third analog channel data within a plurality of third periods;

an analog-to-digital converter (ADC) coupled to the switch for receiving the first analog channel data, the second analog channel data and the third analog channel data from the switch within the first periods, the second periods and the third periods respectively, and performing analog-to-digital conversion on the first analog channel data, the second analog channel data and the third analog channel data according to a sampling frequency to output a digital video signal, wherein the sampling frequency is a plurality of times of a switching frequency of the switch, and on the part of the digital video signal, the ratio of the component corresponding to the first analog channel data vs. the component corresponding to the second analog channel data vs. the component corresponding to the third analog channel data is 4:2:2;

a video processing circuit for outputting a recovery video signal according to the digital video signal; and a decoder for outputting a display signal according to the recovery video signal;

wherein the digital video signal comprises a plurality of first sampling channel data sets, second sampling channel data sets and third sampling channel data sets, the ADC continuously samples the first analog channel data a plurality of times in each of the first periods to obtain the first sampling channel data sets, the ADC continuously samples the second analog channel data a plurality of times in each of the second periods to obtain the second sampling channel data sets, and the ADC continuously samples the third analog channel data a plurality of times in each of the third periods to obtain the third sampling channel data sets, wherein the recovery video signal comprises first digital channel data, second digital channel data and third digital channel data respectively corresponding to the first analog channel data, the second analog channel data and the third analog channel data, and the video processing circuit calculates the average value of the first sampling channel data sets as the first digital channel data in each of the first periods, calculates the average value of the second sampling channel data sets as the second digital channel data in each of the second periods and calculates the average value of the third sampling channel data sets as the third digital channel data in each of the third periods.

10. A video receiving apparatus for receiving an analog video signal comprising first analog channel data second analog channel data and third analog channel data, the video receiving apparatus comprising:

a switch selectively coupled to a first channel, second channel, or a third channel so as to respectively transmit the first analog channel data within a plurality of first periods, the second analog channel data within a plurality of second periods and the third analog channel data within a plurality of third periods;

an analog-to-digital converter (ADC) coupled to the switch for receiving the first analog channel data, the second analog channel data and the third analog channel data from the switch within the first periods, the second periods and the third periods respectively, and performing analog-to-digital conversion on the first analog channel data, the second analog channel data, and the third analog channel data according to a sampling frequency to output a digital video signal, wherein the sampling frequency is a plurality of times of a switching frequency of the switch; and on the part of the digital video signal, the ratio of the component corresponding to the first analog channel data vs. the component corresponding to the second analog channel data vs. the component corresponding to the third analog channel data is 4:2:2;

a video processing circuit for outputting a recovery video signal according to the digital video signal;

and a decoder for outputting a display signal according to the recovery video signal;

wherein the digital video signal comprises a plurality of first sampling channel data sets, second sampling channel data sets and third sampling channel data sets, the ADC continuously samples the first analog channel data a plurality of times in each of first periods to obtain the first sampling channel data sets, the ADC continuously samples the second analog channel data a plurality of times in each of second periods to obtain the second sampling channel data sets and the ADC continuously samples the third analog channel data for a plurality of times in each of third periods to obtain the third sampling channel data sets, wherein the recovery video signal comprises a first digital channel data, a second digital channel data and a third digital channel data respectively corresponding to the first analog channel data, the second analog channel data and the third analog channel data, the video processing circuit selects one of the first sampling channel data as the first digital channel data in each of first periods, selects one of the second sampling channel data as the second digital channel data in each of second periods and selects one of the third sampling channel data as the third digital channel data in each of third periods.

11. A video receiving apparatus for receiving an analog video signal comprising first analog channel data second analog channel data and third analog channel data, the video receiving apparatus comprising:

a switch selectively coupled to a first channel, second channel, or a third channel so as to respectively transmit the first analog channel data within a plurality of first periods, the second analog channel data within a plurality of second periods and the third analog channel data within a plurality of third periods;

an analog-to-digital converter (ADC) coupled to the switch for receiving the first analog channel data, the second analog channel data and the third analog channel data from the switch within the first periods, the second periods and the third periods respectively, and performing analog-to-digital conversion on the first analog channel data, the second analog channel data, and the third analog channel data according to a sampling frequency to output a digital video signal, wherein the sampling frequency is a plurality of times of a switching frequency of the switch; and on the part of the digital video signal, the ratio of the component corresponding to the first analog channel data vs. the component corresponding to the second analog channel data vs. the component corresponding to the third analog channel data is 4:2:2;

a video processing circuit for outputting a recovery video signal according to the digital video signal;

and a decoder for outputting a display signal according to the recovery video signal;

wherein the digital video signal comprises a plurality of first sampling channel data sets, second sampling channel data sets and third sampling channel data sets, the ADC continuously samples the first analog channel data a plurality of times in each of first periods to obtain the first sampling channel data sets, the ADC continuously samples the second analog channel data a plurality of times in each of second periods to obtain the second sampling channel data sets and the ADC continuously samples the third analog channel data for a plurality of times in each of third periods to obtain the third sampling channel data sets, wherein the recovery video signal comprises a first digital channel data, a second digital channel data and a third digital channel data respectively corresponding to the first analog channel data, the second analog channel data and the third analog channel data, and the first sampling channel data sets and the second sampling channel data sets respectively correspond to a plurality of weighted values, the video processing circuit determines the first digital channel data, the second digital channel data and the third digital channel data according to the weighted values in each of first periods second periods and third periods respectively.

12. The video receiving apparatus according to claim 11, wherein the ADC further outputs a selection signal to the video processing circuit, so that the video processing circuit determines whether the ADC is currently outputting the first sampling channel data sets, the second sampling channel data sets, or the third sampling channel data sets.

13. The video receiving apparatus according to claim 12, wherein on the part of the recovery video signal outputted from the video processing circuit, the ratio of the component corresponding to the first sampling channel data sets vs. the component corresponding to the first digital chrominance data vs. the component corresponding to the second digital chrominance data is 4:2:2.

14. The video receiving apparatus according to claim 11, wherein the video processing circuit further outputs a selection signal to the decoder, so that the decoder determines whether the second digital channel data is first digital chrominance data or second digital chrominance data.

15. A video receiving apparatus for receiving an analog video signal comprising first analog channel data and second analog channel data, the video receiving apparatus comprising:
  a switch selectively coupled to a first channel or a second channel so as to respectively transmit the first analog channel data within a plurality of first periods and the second analog channel data within a plurality of second periods;
  an analog-to-digital converter (ADC) coupled to the switch for receiving the first analog channel data and the second analog channel data from the switch within the first periods and the second periods respectively, and performing analog-to-digital conversion on the first analog channel data and the second analog channel data respectively according to a sampling frequency to output a digital video signal, wherein the sampling frequency is a plurality of times of a switching frequency of the switch;
  a video processing circuit for outputting a recovery video signal according to the digital video signal, wherein on the part of the recovery video signal, the ratio of the brightness component vs. the first chrominance component vs. the second chrominance component is 4:2:2; and
  a decoder for outputting a display signal according to the recovery video signal;
  wherein the digital video signal comprises a plurality of first sampling channel data sets and second sampling channel data sets, the ADC continuously samples the first analog channel data a plurality of times in each of the first periods to obtain the first sampling channel data sets, and the ADC continuously samples the second analog channel data a plurality of times in each of the second periods to obtain the second sampling channel data sets,
  wherein the recovery video signal comprises first digital channel data and second digital channel data which correspond to the first analog channel data and the second analog channel data respectively and the video processing circuit calculates the average value of the first sampling channel data sets as the first digital channel data in each of the first periods and calculates the average value of the second sampling channel data sets as the second digital channel data in each of the second periods.

16. A video receiving apparatus for receiving an analog video signal comprising a first analog channel data and a second analog channel data, the video receiving apparatus comprising:
  a switch selectively coupled to a first channel or a second channel so as to respectively transmit the first analog channel data within a plurality of first periods and the second analog channel data within a plurality of second periods;
  an analog-to-digital converter (ADC) coupled to the switch for receiving the first analog channel data and the second analog channel data from the switch within the first periods and the second periods respectively, and performing analog-to-digital conversion on the first analog channel data and the second analog channel data respectively according to a sampling frequency to output a digital video signal, wherein the sampling frequency is a plurality of times of a switching frequency of the switch;
  a video processing circuit for outputting a recovery video signal according to the digital video signal, wherein on the part of the recovery video signal, the ratio of the brightness component vs. the first chrominance component vs. the second chrominance component is 4:2:2; and
  a decoder for outputting a display signal according to the recovery video signal;
  wherein the digital video signal comprises a plurality of first sampling channel data sets and second sampling channel data sets, the ADC continuously samples the first analog channel data a plurality of times in each of the first periods to obtain the first sampling channel data sets and the ADC continuously samples the second analog channel data a plurality of times in each of the second periods to obtain the second sampling channel data sets,
  wherein the recovery video signal comprises first digital channel data and second digital channel data which correspond to the first analog channel data and the second analog channel data respectively and the video processing circuit selects one of the first sampling channel data sets as the first digital channel data in each of the first periods and selects one of the second sampling channel data sets as the second digital channel data in each of the second periods.

17. A video receiving apparatus for receiving an analog video signal comprising first analog channel data and second analog channel data, the video receiving apparatus comprising:
  a switch selectively coupled to a first channel or a second channel so as to respectively transmit the first analog channel data within a plurality of first periods and the second analog channel data within a plurality of second periods;

an analog-to-digital converter (ADC) coupled to the switch for receiving the first analog channel data and the second analog channel data from the switch within the first periods and the second periods respectively, and performing analog-to-digital conversion on the first analog channel data and the second analog channel data respectively according to a sampling frequency to output a digital video signal, wherein the sampling frequency is a plurality of times of a switching frequency of the switch;

a video processing circuit for outputting a recovery video signal according to the digital video signal, wherein on the part of the recovery video signal, the ratio of the brightness component vs. the first chrominance component vs. the second chrominance component is 4:2:2; and a decoder for outputting a display signal according to the recovery video signal;

wherein the digital video signal comprises a plurality of first sampling channel data sets and second sampling channel data sets, the ADC continuously samples the first analog channel data a plurality of times in each of the first periods to obtain the first sampling channel data sets and the ADC continuously samples the second analog channel data a plurality of times in each of the second periods to obtain the second sampling channel data sets, wherein the recovery video signal comprises first digital channel data and second digital channel data which correspond to the first analog channel data and the second analog channel data respectively and the first sampling channel data sets and the second sampling channel data sets respectively correspond to a plurality of weighted values, the video processing circuit determines the first digital channel data according to the weighted values in each of the first periods respectively and determines the second digital channel data according to the weighted values in each of the second periods respectively.

18. The video receiving apparatus according to claim 17, wherein the ADC further outputs a selection signal to the video processing circuit, so that the video processing circuit determines whether the ADC is currently outputting the first sampling channel data sets or the second sampling channel data sets.

19. The video receiving apparatus according to claim 17, wherein the video processing circuit further outputs a selection signal to the decoder, so that the decoder determines whether the second digital channel data is first digital chrominance data or second digital chrominance data.

* * * * *